May 28, 1946. C. D. MILLER 2,400,886
NONINTERMITTENT MOTION-PICTURE PROJECTOR
Filed July 1, 1940
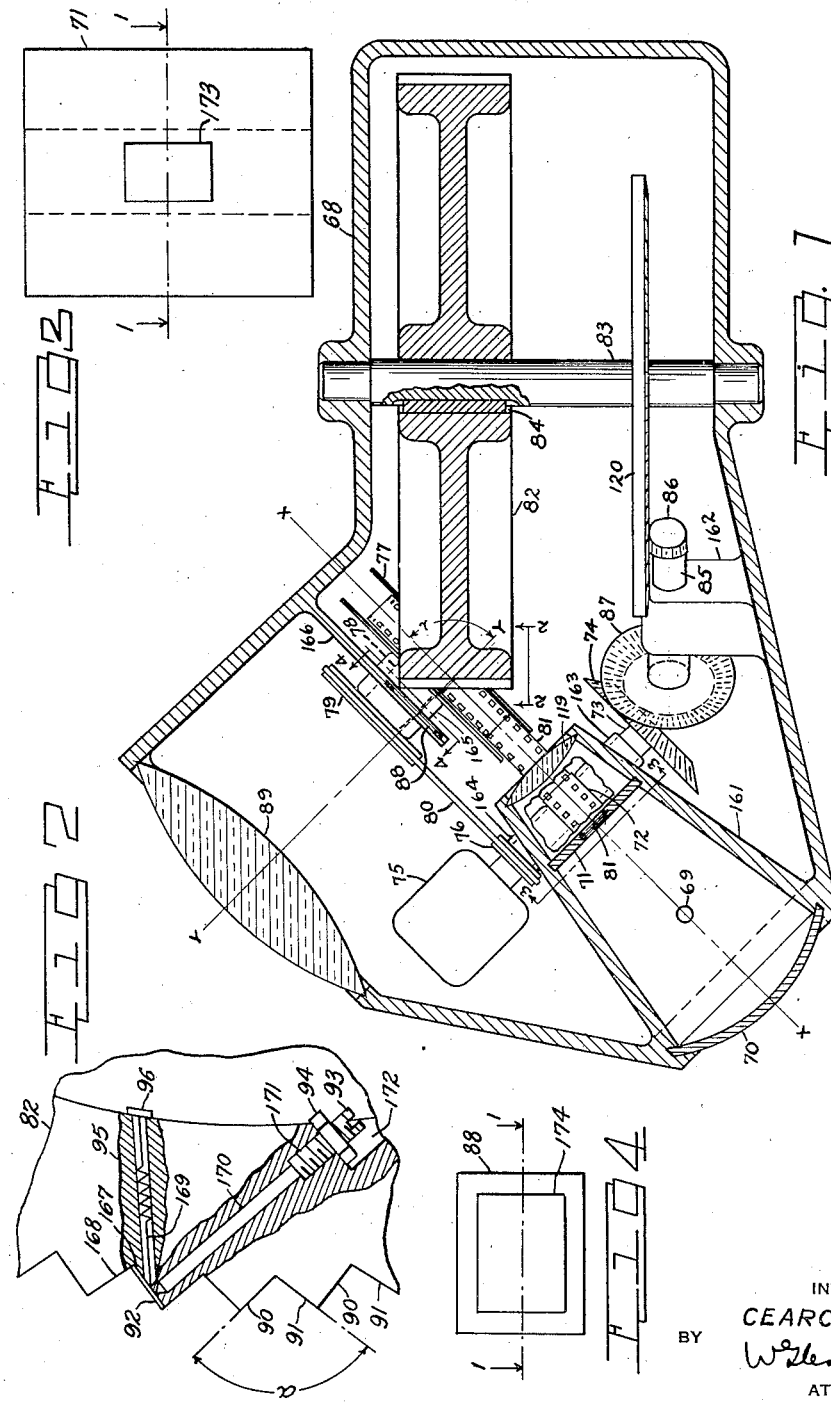
INVENTOR
CEARCY D. MILLER
BY
ATTORNEY Patented May 28, 1946

2,400,886

UNITED STATES PATENT OFFICE 2,400,886

NONINTERMITTENT MOTION-PICTURE PROJECTOR

Cearcy D. Miller, Hampton, Va.

Application July 1, 1940, Serial No. 343,417

8 Claims. (Cl. 88—16.8)

(Granted under the act of March 3, 1883, as amended April 30, 1928; 370 O. G. 757)

This invention relates to a device capable of projecting motion pictures without stopping or varying the speed of the motion-picture film during the process of projection and without at any time cutting off or varying the intensity of the useful illumination reaching the projection screen. It is essentially a reversal of a modified form of the high-speed motion-picture camera covered in my copending application Serial No. 340,068.

It has long been understood by those skilled in the art of motion-picture projection that the non-intermittent projector has important advantages to offer as compared with the intermittent type if only a non-intermittent projector could be designed which would give a projected image with definition equal to that of images projected by the highly developed intermittent projectors now in use, and which would be no more expensive to manufacture. These advantages include the following: The non-intermittent projector is less noisy in operation. The non-intermittent projector causes less wear and tear on the film, due to the elimination of the necessity of rapid acceleration and deceleration of the film. Use of the non-intermittent projector makes it possible to place the sound gate and the optical gate at the same position along the film. This greatly simplifies the operator's task of threading film through the projector, eliminates the possibility of his getting sound and optics incorrectly phased, and contributes to reduction of film wear and tear. It also does away with the displacement of the sound track relative to the photographs on the film, which eliminates difficulty in assembling and in altering films. Use of a non-intermittent projector which throws light on the projection screen without interruption, as this device does, permits use of a less powerful light source than is at present used or makes possible a more brilliant illumination of the screen with use of the same light source. (Brilliancy of illumination as referred to here is the quantity $$\int_0^T \frac{I\,dt}{T}$$

where I is the intensity of screen illumination at any instant expressed as a function of time $t$ and T is the time of a complete cycle of operation.

$$\int_0^T \frac{I\,dt}{T}$$

is the apparent brilliancy of the projection screen as seen by the eye.) Less eye strain results from the elimination of even high frequency flicker due to the projection of steady light on the screen. It is also possible that the apparent smoothness of motion of any moving object portrayed on the screen can be improved by producing a "fade-in" and "fade-out" effect with the non-intermittent projector, that is by having one picture frame gradually fade out as the next picture frame gradually fades in, instead of producing sudden shift from one picture frame to the next. The fade-in and fade-out effect can be produced with this device. As for the quality of the image produced on the projection screen there is no apparent reason why this could not be made as good with this device as with the intermittent projector.

With the foregoing and other objects in view, the invention consists in the construction, combination and arrangement of parts hereinafter described and illustrated in the drawing, in which, Fig. 1 is a horizontal section through the device, on line I—I of Figs. 3 and 4.

Fig. 2 is a side-elevation of a portion of the mirror drum 82 as seen projected on line 2—2 of Fig. 1, with cut-away portions shown in cross-section.

Fig. 3 is a side-elevation of film gate 71 as seen projected on line 3—3 of Fig. 1.

Fig. 4 is a side-elevation of framing gate 88 as seen projected on line 4—4 of Fig. 1.

Referring particularly to Fig. 1, the numeral 68 indicates the main frame of this device. Numerals 161, 162, 163, 164, 165, and 166 indicate projections of frame 68 or stationary parts rigidly attached thereto. Rotatably mounted in projections 163 and 164 of frame 68 is shaft 73, driven by direct-connected motor 75 or other suitable means. Rigidly mounted on shaft 73 is sprocket wheel 72 which draws film 81 from feed reel (not shown), through film gate 71, Figs. 1 and 3, which is rigidly mounted in projection 161 of frame 68. After passage around sprocket wheel 72, film 81 is wound on take-up reel 77 which is secured on shaft 78, which shaft is rotatably mounted in projection 165 of frame 68. Shaft 78, with take-up reel 77, is driven by spring belt 80 passing over pulleys 76 and 79, which are rigidly attached to shafts 73 and 78, respectively. The ratio of diameters of pulleys 76 and 79 is such that take-up reel 77 will take up film as fast as it is drawn through by sprocket 72, even when there are only a few inches of film 81 wound on take-up reel 77. The necessary slower turning of take-up reel 77 as more film is wound on it is allowed by slippage of the spring belt 80.

Rigidly mounted on shaft 73 is bevel gear 74, meshing with bevel gear 87, which is rigidly mounted on shaft 85, which in turn is rotatably mounted in projection 162 of frame 68. Also rigidly mounted on shaft 85 is bevel pinion gear 86, meshing with crown gear 120, which is rigidly mounted on shaft 83, which in turn is rotatably mounted in frame 68. Also rigidly mounted on shaft 83, with key 84, is mirror wheel 82. A projection of a portion of this mirror wheel on line 2—2 of Fig. 1 is shown in Fig. 2. In this figure, the numerals 90 and 91 indicate mirror surfaces which may be either polished surfaces of the metal of mirror wheel 82 or individual mirrors fastened by any suitable means to the mirror wheel. They may also be glass prisms such as used in the high-speed motion-picture camera described in the patent application above referred to. The angle $\alpha$ in Fig. 2 between mirror surfaces 90 and 91 should be 90° as nearly as possible.

An alternative arrangement may be used involving movable mirror 92, Fig. 2. This mirror is so arranged as to pivot about its edge 167 which projects into a groove in mirror face 168. To the back of movable mirror 92 is fastened one end of coil spring 95, which extends through hole 169 drilled through the metal of mirror wheel 82. The other end of coil spring 95 is attached to lug 96, which serves simply to hold the spring taut. This arrangement is for the purpose of holding movable mirror 92 firmly against adjusting screw 93, which extends through hole 170 in mirror wheel 82, screwing into enlarged threaded portion of this hole 171. Screw 93 is locked in position by locknut 94, a countersink 172 being provided in order to form a locking surface for locknut 94. By means of adjusting screw 93, and the other parts just described, the movable mirror 92 may be adjusted to provide an extremely accurate right angle between mirror faces 92 and 168. This arrangement is intended merely as a schematic illustration as to how adjustable mirror faces might be provided, and it is not to be understood as limiting this device to the use of this particular type of adjusting mechanism.

Referring again to Fig. 1 of the drawing, the ratios of gears 74 and 87 and gears 86 and 120 must be such that sprocket wheel 72 makes N complete revolutions for each single revolution of mirror wheel 82 where $$N = \frac{n_1 n_3}{n_2}$$

$n_1$ being the number of faces 90 or the number of faces 91 on mirror wheel 82, $n_2$ being the number of teeth on one side of sprocket wheel 72, and $n_3$ being the number of perforations per picture frame on one side of film 81. Film metering sprocket 72 must be so phased with mirror wheel 82 that the exact center of an individual frame of film 81 will cross axis X—X, which is in the plane of Fig. 1, at the same instant that the 90° angle between one pair of faces 90 and 91 on mirror wheel 82 crosses the same axis.

Numeral 69 indicates a light source, on axis X—X, rigidly secured in projection 161 of frame 68. Numeral 70 indicates a reflector rigidly secured in frame 68 and of such focal length as to form an image of light source 69 at the center of lens 119, which is rigidly mounted in projection 161 of frame 68 with its optical axis identical with axis X—X. The light cone extending from reflector 70 to lens 119 is large enough in cross-section at film gate 71 to cover the entire aperture 173 in the gate, see Fig. 3. The lens 119 is of such focal length and is so placed as to form an image of the pictures appearing on film 81 at the framing gate 88 (which is rigidly mounted in projection 166 of frame 68) after reflection by mirrors 90 and 91 on mirror wheel 82 from axis X—X to axis Y—Y, axis Y—Y being in the plane of Fig. 1. It is also of such focal length and is so placed that the ratio of size of image at framing gate 88 to size of image on film 81 is $$h_2/h_1 = 2x/y$$

where $x$ is the distance between two successive mirror pairs 90 and 91 on mirror wheel 82 and $y$ is the height of a single picture frame on the film. Lens 89 is rigidly mounted in frame 68, with its optical axis identical with axis Y—Y, and is of such focal length and is so placed as to form on the projection screen an image of the aperture 174 in framing gate 88, see Fig. 4. The aperture 174 in framing gate 88 is of the same size and shape as the image produced at this point by lens 119 of a single picture frame of film 81. Light source 69, reflector 70, film gate aperture 173, and framing gate aperture 174 all have their centers in axis X—X or axis Y—Y, as the case may be. Axes X—X and Y—Y intersect in the plane of Fig. 1 at a point through which the intersections of faces 90 and 91 on mirror wheel 82 pass as the mirror wheel rotates. The bisector of angle $\gamma$ see Fig. 1, between axes X—X and Y—Y is perpendicular to the intersection of faces 90 and 91 of mirror wheel 82 at the time this intersection crosses these axes.

As stated above, film-metering sprocket 72 and mirror wheel 82 are so phased that the line of intersection of a particular mirror pair 90 and 91 on mirror wheel 82 crosses axis X—X at the exact instant the center of a particular picture frame on film 81 crosses the same axis. In the discussion which follows, this particular picture frame will be referred to as picture frame No. 2 and the particular mirror pair will be referred to as mirror pair No. 2. The picture frame next above picture frame No. 2 will be referred to as picture frame No. 1 and that just below No. 2 as picture frame No. 3. Mirror pair just below mirror pair No. 2 will be referred to as mirror pair No. 1, and that just above No. 2 will be referred to as mirror pair No. 3.

Under all the conditions above specified, all light coming from picture frame No. 1 and falling on mirror pair No. 1, coming from picture No. 2 and falling on mirror pair No. 2, or coming from picture frame No. 3 and falling on mirror pair No. 3 will be reflected to its proper position in the stationary image at framing gate 88. All light coming from picture frame No. 1 and falling on mirror pair No. 2, or coming from picture frame No. 2 and falling on mirror pair No. 3, will be reflected to a stationary image just below the opening in framing gate 88 and will be intercepted by the gate and by projection 166 of frame 68 surrounding the gate (the opening in the gate being the exact size and in the exact position of the central image). All light coming from picture frame No. 2 and falling on mirror pair No. 1, or coming from picture frame No. 3 and falling on mirror pair No. 2, will be reflected to a stationary image just above the opening in framing gate 88 and will be intercepted. Consequently, all light passing through framing gate 88 will be brought to a focus forming a single image on the projection screen by lens 89.

In Fig. 1 the angle $\gamma$ between axes X—X and Y—Y is approximately 90°. The quality of projection as well as the desirable feature fade-in and fade-out of successive picture frames can be improved by decreasing the angle γ, at the same time bringing lens 119 closer to the intersection of axes X—X and Y—Y and framing gate 88 farther away from this intersection. Moving framing gate 88 farther away from the intersection of axes X—X and Y—Y increases the need for the adjustable type of mirrors on mirror wheel 82 in order to prevent production of double images within aperture 174 of framing gate 88.

It is not to be understood as limiting this device to use of the means shown in Fig. 1 for carrying reflecting surfaces 90 and 91 across the axis X—X and the axis Y—Y as it is apparent that these reflecting surfaces could be carried across these axes in any one of a number of ways without conflicting with the spirit of this invention. Neither is it to be understood as limiting this device to use of the means shown for transmitting motion from shaft 73 to shaft 83 or from shaft 73 to shaft 78, as it is apparent that numerous other means could be used. It is not to be understood as limiting this device to use of the simple type of lenses 119 and 89 shown in Fig. 1 of the drawing as it is evident that compound lenses with any degree of optical corrections can be used.

In order to appreciate fully the advantage attained in this device by locating the image formed by lens 119, Fig. 1, near the intersection of axes X—X and Y—Y, it is necessary to consider in more detail the reflecting surfaces 90 and 91 of mirror wheel 82, see Fig. 2. Approximately half the light passing through a given point in the moving film 81 and also passing through the aperture 174 in framing gate 88, see Fig. 4, will be reflected from a mirror surface 90, Fig. 2, to a mirror surface 91 and thence to aperture 174 in framing gate 88. This light will hereinafter be referred to as following mirror path No. 1. The other half of the light passing through the same point in moving film 81 and passing through aperture 174 in framing gate 88 will be reflected from mirror surface 91 to mirror surface 90 and thence through aperture 174 in framing gate 88. This light will hereinafter be referred to as following mirror path No. 2. If the angle between the particular mirror surfaces 90 and 91 involved is not exactly 90° the light following mirror path No. 1 will not reach the same point in aperture 174 of framing gate 88 as the light following mirror path No. 2, even though it comes from the same point in the moving film 81. This results in two images being formed within the aperture 174 in framing gate 88, somewhat displaced from each other, and consequently the same result is produced on the projection screen. Now the nearer framing gate 88 can be placed to the intersection of axes X—X and Y—Y the smaller will be the separation between the two images formed by light following mirror paths 1 and 2 with a given departure of the angle between mirror surfaces 90 and 91 from an exact right angle. By locating the framing gate 88 in the manner shown in Fig. 1 of the drawing, the separation between these images can be reduced to a negligible amount with a reasonable tolerance for the angle between mirror surfaces 90 and 91. It is not to be understood that this device is limited to the use of the reflecting surfaces 90 and 91 of Fig. 2 as a compensating means. It is recognized that a similar result may be gotten by any optical device which inverts a beam of light with respect to a neutral plane, such neutral plane being perpendicular to the plane of motion of the device, fixed with reference to the device itself, and parallel to the optical axis of the beam. It is also recognized that any such optical device is likely to have aberrations due to small inaccuracies in its construction which can be practically eliminated by forming an image as close as possible to the position of the compensating device in the optical path.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

What is claimed is:

1. In a motion-picture projection machine, means for moving motion-picture film across a concentrated beam of light with continuous uniform velocity, means comprising an optical lens or lenses for forming primary images of the picture frames appearing on said film, such primary images moving with a continuous uniform velocity, a multiplicity of reflective light-beam-inverting mechanisms comprising essentially pairs of reflective surfaces making angles of approximately ninety degrees with each other arranged to move across the beam of light producing the aforesaid moving primary images at a point along the length of said beam as near as practicable to said primary images and so near to said primary images as to practically eliminate the formation of double images caused by small errors in the 90° angle between the two reflective surfaces of any of the said light-beam-inverting mechanisms, said light-beam-inverting mechanisms being adapted when so moved at a particular speed and with a particular synchronization with respect to the aforesaid moving motion-picture film to reflect the aforesaid light beam, stopping all translatory motion of said beam and thereby causing a stationary primary image to be formed concentric with the central axis of said beam, means comprising a framing screen in the plane of the aforesaid primary images for intercepting all images except the aforesaid image that is concentric with the central axis of the aforesaid beam, means comprising an optical lens or lenses for refocusing all light passing the aforesaid framing screen to form a stationary secondary image on a motion-picture projection screen, and means interconnecting the aforesaid means for moving motion-picture film and the aforesaid light-beam-inverting mechanisms for so synchronizing and controlling relative velocities of motion of the aforesaid film and the aforesaid light-beam-inverting mechanisms as to allow light-beam-inverting mechanisms to perform the function described.

2. In a motion-picture projection machine, means for moving motion-picture film across a concentrated beam of light with continuous uniform velocity, means comprising an optical lens or lenses for forming primary images of the picture frames appearing on said film, such primary images moving with a continuous uniform velocity; a multiplicity of light-beam-inverting mechanisms arranged to move across the beam of light producing the aforesaid moving primary images at a point along the length of said beam as near as practicable to said primary images and so near to said images as to render negligible any irregular displacement of said primary images caused by small inaccuracies in the light-beam-inverting mechanisms, said light-beam-inverting mechanisms being adapted when so moved at a particular speed and with a particular synchronization with respect to the aforesaid moving motion-picture film to stop all translatory motion of said beam and thereby cause a stationary primary image to be formed concentric with the central axis of said beam; means comprising a framing screen in the plane of the aforesaid primary images for intercepting all images except the aforesaid image that is concentric with the central axis of the aforesaid beam, means comprising an optical lens or lenses for refocusing all light passing the aforesaid framing screen to form a stationary secondary image on a motion-picture projection screen; and means interconnecting the aforesaid means for moving motion-picture film and the aforesaid light-beam-inverting mechanisms for so synchronizing and controlling relative velocities of motion of the aforesaid film and the aforesaid light-beam-inverting mechanisms as to allow light-beam-inverting mechanisms to perform the function described.

3. In a motion-picture projection machine, means for moving motion-picture film across a concentrated beam of light with continuous uniform velocity; means comprising an optical lens or lenses for forming primary images of the picture frames appearing on said film, such primary images moving with a continuous uniform velocity; a multiplicity of reflective light-beam-inverting mechanisms, comprising essentially pairs of reflective surfaces making an angle of approximately ninety degrees with each other, arranged to move across the beam of light producing the aforesaid moving primary images at a point along the length of said beam as near as practicable to said primary images and so near to said primary images as to practically eliminate the formation of double images caused by small errors in the 90° angle between the two reflective surfaces of any of the said light-beam-inverting mechanisms, said light-beam-inverting mechanisms being adapted when so moved at a particular speed and with a particular synchronization with respect to the aforesaid moving motion-picture film to reflect the aforesaid light beam, the reflected beam making an angle with the incident beam in a plane perpendicular to the direction of motion of the aforesaid primary images, stopping all translatory motion of said beam and thereby causing a stationary primary image to be formed concentric with the central axis of said beam; means comprising a framing screen in the plane of the aforesaid primary images for intercepting all images except the aforesaid image that is concentric with the central axis of the aforesaid beam, means comprising an optical lens or lenses for refocusing all light passing the aforesaid framing screen to form a stationary secondary image on a motion-picture projection screen, and means interconnecting the aforesaid means for moving the aforesaid motion-picture film and the aforesaid light-beam-inverting mechanisms for so synchronizing and controlling relative velocities of motion of the aforesaid film and the aforesaid light-beam-inverting mechanisms as to allow light-beam-inverting mechanisms to perform the function described.

4. In a motion-picture projection machine, means for moving motion-picture film across a concentrated beam of light with continuous uniform velocity; means for forming primary images of the picture frames appearing on said film, such primary images moving with a continuous uniform velocity; a multiplicity of light-beam-inverting mechanisms arranged to move across the beam of light producing the aforesaid moving primary images at a point along the length of said beam as near as practicable to said primary images and so near to said images as to render negligible any irregular displacement of said primary images caused by small inaccuracies in the light-beam-inverting mechanisms, said light-beam-inverting mechanisms being adapted when so moved at a particular speed and with a particular synchronization with respect to the aforesaid moving motion-picture film to stop all translatory motion of said beam and thereby cause a stationary primary image to be formed concentric with the central axis of said beam; means for intercepting all images except the aforesaid image that is concentric with the central axis of the aforesaid beam; means for refocusing all light not intercepted by the aforesaid means to form a stationary secondary image on a motion-picture projection screen, and means interconnecting the aforesaid means for moving motion-picture film and the aforesaid light-beam-inverting mechanisms for so synchronizing and controlling relative velocities of motion of the aforesaid film and the aforesaid light-beam-inverting mechanisms as to allow light-beam-inverting mechanisms to perform the function described.

5. In a motion-picture projection machine, means for moving motion-picture film across a concentrated beam of light with continuous uniform velocity; means for forming primary images of the picture frames appearing on said film, such primary images moving with a continuous uniform velocity; a multiplicity of reflective light-beam-inverting mechanisms comprising pairs of reflective surfaces making angles with each other adjustable to a value of ninety degrees within close limits and arranged to move across the beam of light producing the aforesaid moving primary images at a point along the length of said beam as near as practicable to said primary images and so near to said primary images as to practically eliminate the formation of double images caused by small errors in the 90° angle between the two reflective surfaces of any of said light-beam-inverting mechanisms, said light-beam-inverting mechanisms being adapted when so moved at a particular speed and with a particular synchronization with respect to the aforesaid moving motion-picture film to reflect the aforesaid light beam, stopping all translatory motion of said beam and thereby causing a stationary primary image to be formed concentric with the central axis of said beam; means for intercepting all images except the aforesaid image that is concentric with the central axis of the aforesaid beam; means for refocusing all light not intercepted by the aforesaid means to form a stationary secondary image on a motion-picture projection screen, and means interconnecting the aforesaid means for moving the motion-picture film and the aforesaid light-beam-inverting mechanisms for so synchronizing and controlling relative velocities of the aforesaid film and the aforesaid light-beam-inverting mechanisms as to allow light-beam-inverting mechanisms to perform the function described.

6. In a motion-picture projection machine, means for moving motion-picture film across a concentrated beam of light with continuous uniform velocity; means for forming images of the picture frames appearing on said film, such images moving with a continuous uniform velocity; a multiplicity of reflective light-beam-inverting mechanisms comprising pairs of reflective surfaces making angles with each other adjustable to a value of ninety degrees within close limits and arranged to move across the beam of light producing the aforesaid moving images at a point along the length of said beam as near as practicable to aforesaid moving images and so near to aforesaid moving images as to practically eliminate the formation of double images caused by small errors in the 90° angle between the two reflective surfaces of any of the said light-beam-inverting mechanisms, said light-beam-inverting mechanisms being adapted when so moved at a particular speed and with a particular synchronization with respect to the aforesaid moving motion-picture film to reflect the aforesaid light beam, stopping all translatory motion of said beam and thereby causing a stationary image to be formed concentric with the central axis of said beam, and means interconnecting the aforesaid means for moving motion-picture film and the aforesaid light-beam-inverting mechanisms for so synchronizing and controlling relative velocities of motion of the aforesaid film and the aforesaid light-beam-inverting mechanisms as to allow light-beam-inverting mechanisms to perform the function described.

7. In a motion-picture projection machine, means for moving motion-picture film across a concentrated beam of light with continuous uniform velocity; means for forming primary images of the picture frames appearing on said film, such primary images moving with a continuous uniform velocity; a multiplicity of light-beam-inverting mechanisms arranged to move across the beam of light producing the aforesaid moving primary images at a point along the length of said beam as near as practicable to the aforesaid primary images and so near to the aforesaid primary images as to render negligible any irregular displacement of the aforesaid primary images caused by small inaccuracies in the light-beam-inverting mechanisms, said light-beam-inverting mechanisms being adapted when so moved at a particular speed and with a particular synchronization with respect to the aforesaid moving motion-picture film to stop all translatory motion of said beam and thereby cause a stationary image to be formed concentric with the central axis of said beam; means for refocusing all light that passes through the aforesaid stationary image that is concentric with the central axis of the aforesaid beam to form a stationary secondary image on a motion-picture projection screen, and means interconnecting the aforesaid means for moving motion-picture film and the aforesaid light-beam-inverting mechanisms for so synchronizing and controlling relative velocities of motion of the aforesaid film and the aforesaid light-beam-inverting mechanisms as to allow light-beam-inverting mechanisms to perform the function described.

8. In a motion-picture projection machine, means for moving motion-picture film across a concentrated beam of light with continuous uniform velocity; means for forming images of the picture frames appearing on said film, such images moving with a continuous uniform velocity, a multiplicity of light-beam-inverting mechanisms arranged to move across the beam of light producing the aforesaid moving images at a point along the length of said beam as near as practicable to the aforesaid moving images and so near to aforesaid moving images as to render negligible any displacement of the aforesaid moving images caused by small inaccuracies in the light-beam-inverting mechanisms, said light-beam-inverting mechanisms being adapted when so moved at a particular speed and with a particular synchronization with respect to the aforesaid moving motion-picture film to stop all translatory motion of said beam and thereby cause a stationary image to be formed concentric with the central axis of said beam, and means interconnecting the aforesaid means for moving motion-picture film and the aforesaid light-beam-inverting mechanisms for so synchronizing and controlling relative velocities of motion of the aforesaid film and the aforesaid light-beam-inverting mechanisms as to allow light-beam-inverting mechanisms to perform the function described.

CEARCY D. MILLER.